No. 645,822. Patented Mar. 20, 1900.
H. L. MANNING.
BLIND STILE BORING MACHINE.
(Application filed Apr. 22, 1899.)
(No Model.) 7 Sheets—Sheet 2.
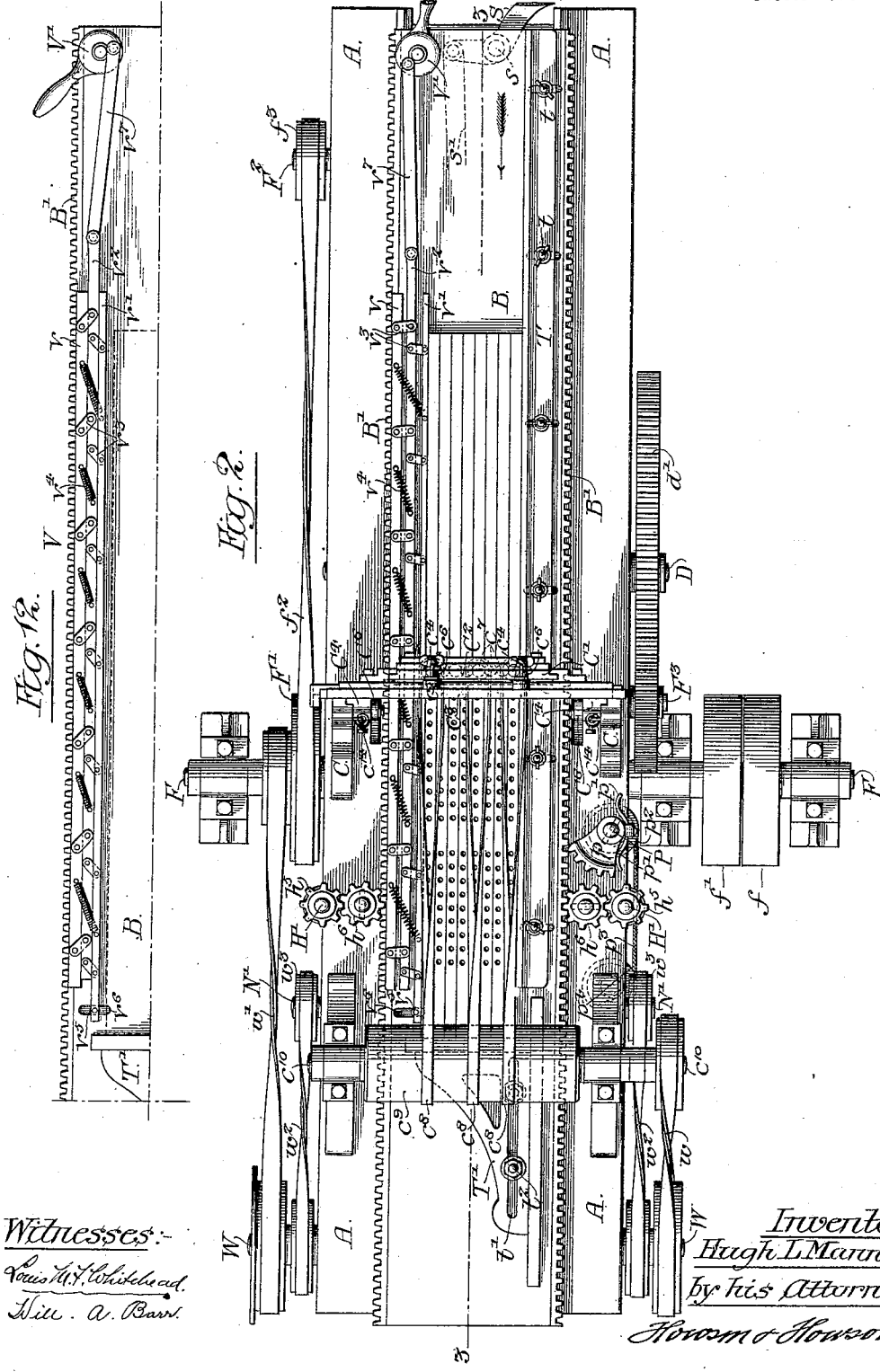
Witnesses:
Louis M. F. Whitehead.
Will. A. Barr.
Inventor:
Hugh L. Manning
by his Attorneys:
Howson & Howson No. 645,822. Patented Mar. 20, 1900.
H. L. MANNING.
BLIND STILE BORING MACHINE.
(Application filed Apr. 22, 1899.)
(No Model.) 7 Sheets—Sheet 3.
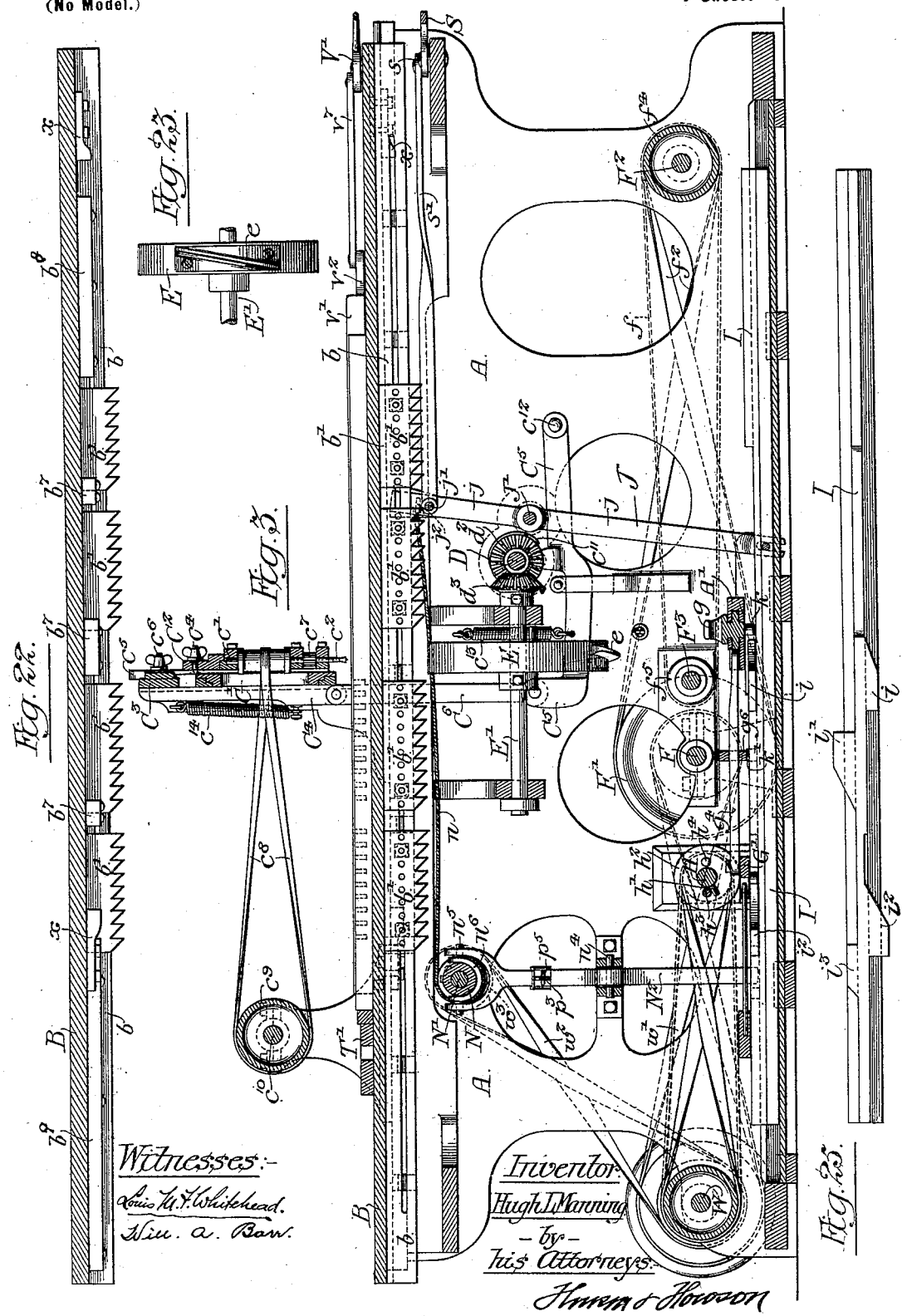
Witnesses:-
Louis M. F. Whitehead.
Wm. A. Barr.
Inventor
Hugh L. Manning
—by—
his Attorneys
Howson & Howson

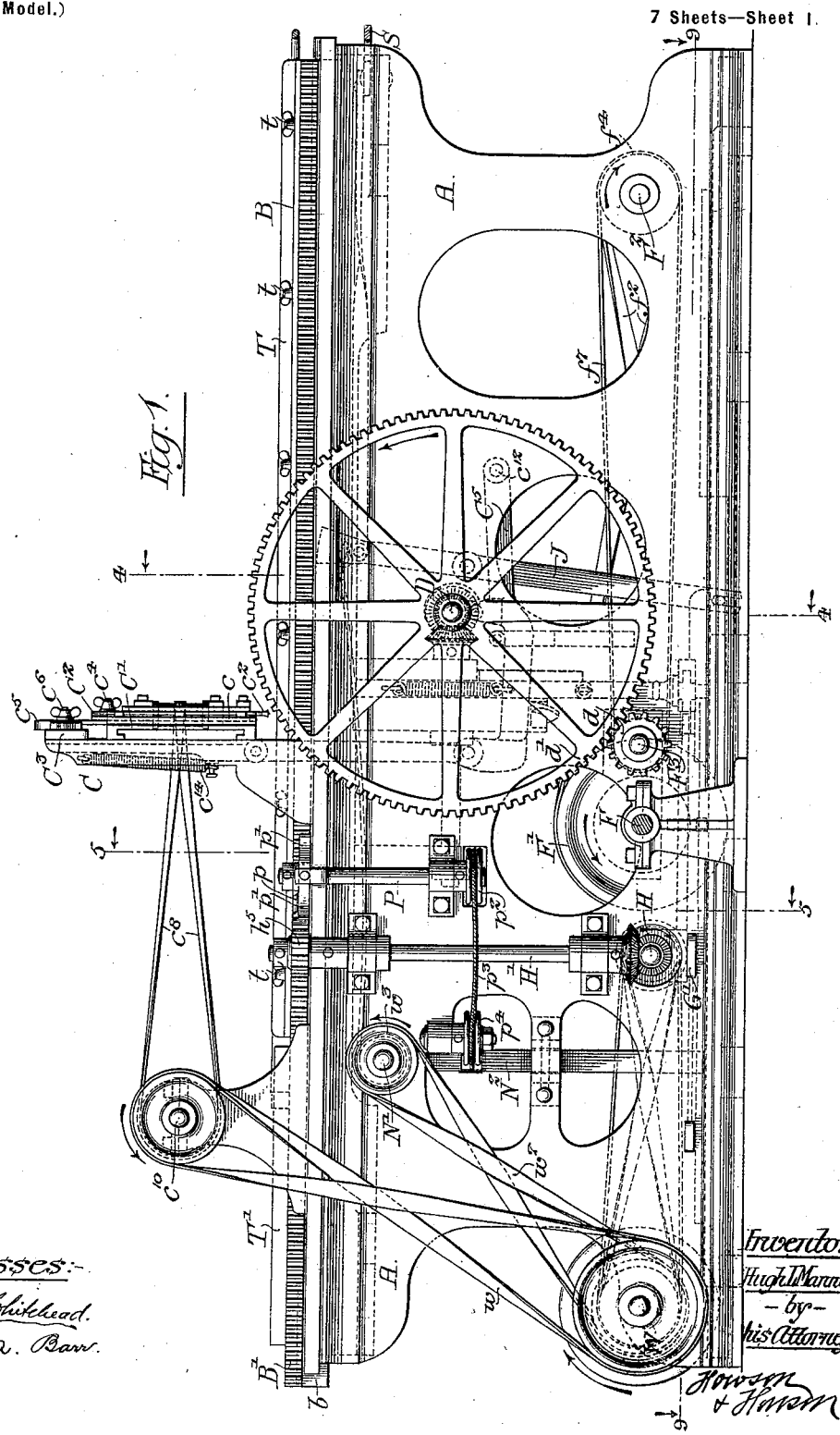

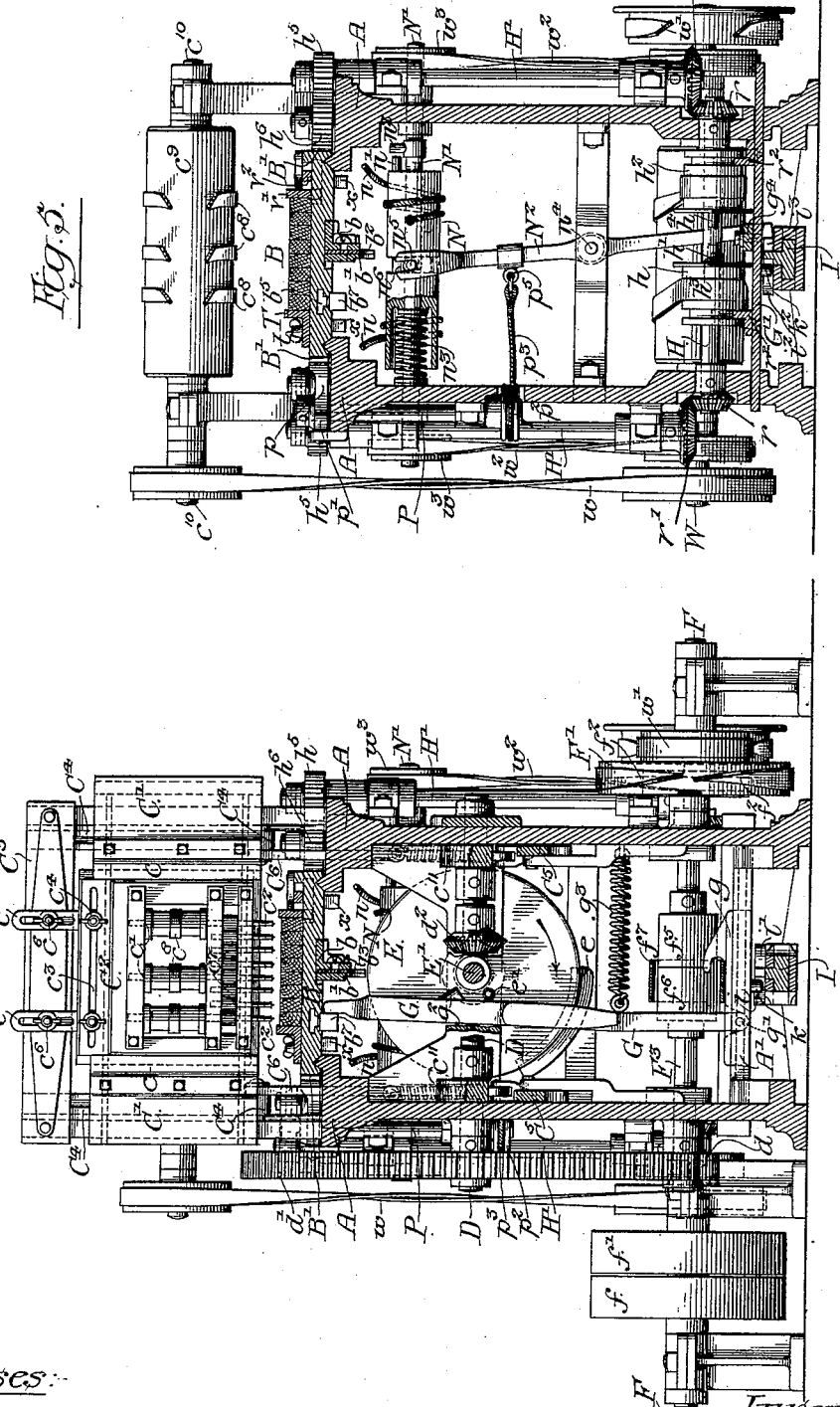

No. 645,822. Patented Mar. 20, 1900.
H. L. MANNING.
BLIND STILE BORING MACHINE.
(Application filed Apr. 22, 1899.)
(No Model.) 7 Sheets—Sheet 5.
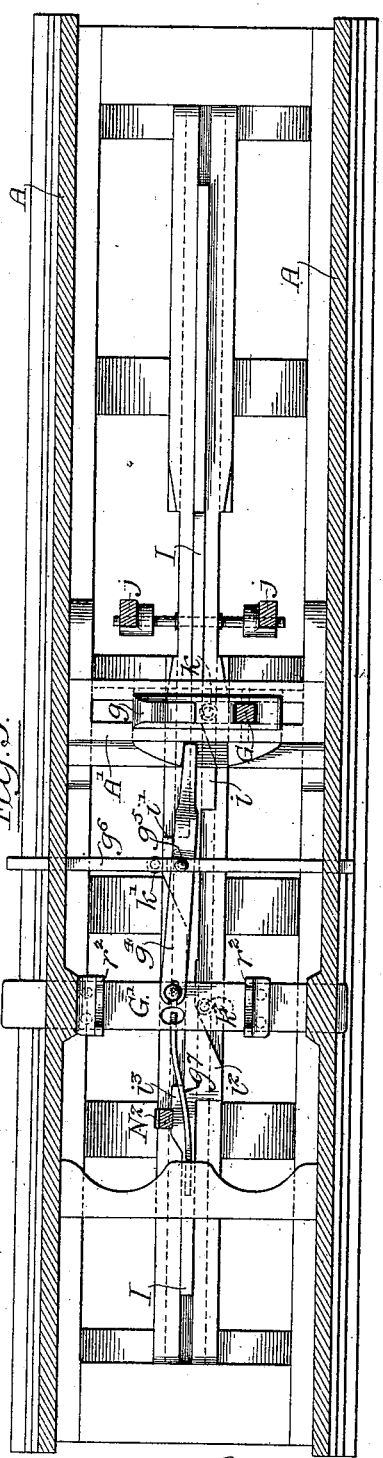
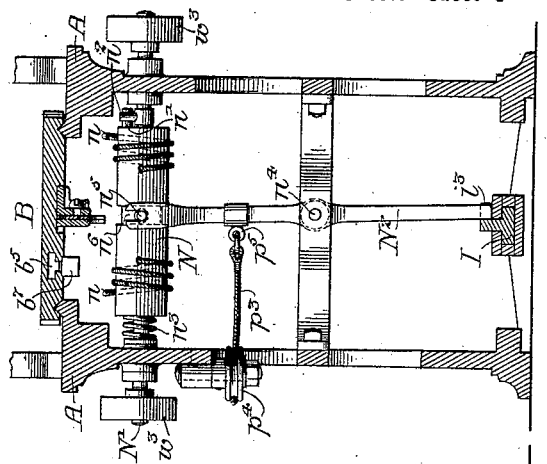
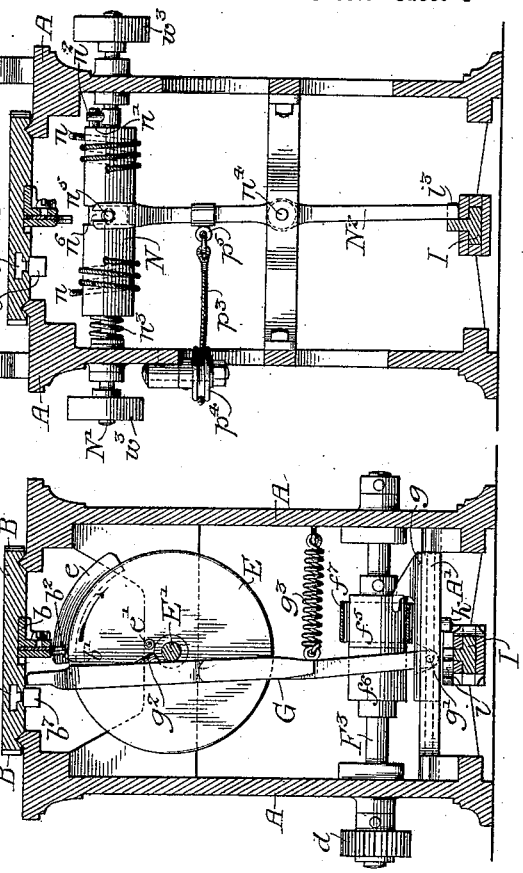
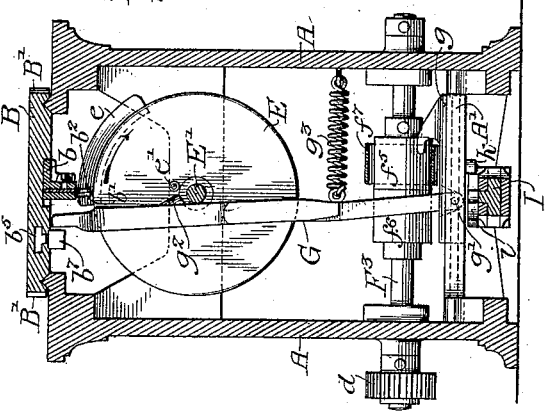
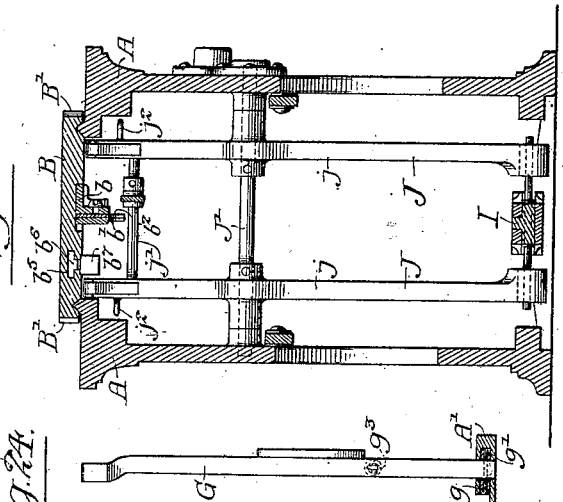
Witnesses:
Louis M. V. Whitehead.
Wm. A. Barr.
Inventor:
Hugh L. Manning.
by his Attorneys: Howson & Howson No. 645,822. Patented Mar. 20, 1900.
H. L. MANNING.
BLIND STILE BORING MACHINE.
(Application filed Apr. 22, 1899.)

(No Model.) 7 Sheets—Sheet 6.

Witnesses:— —by— Inventor:—
his Attorneys:— Hugh L. Manning

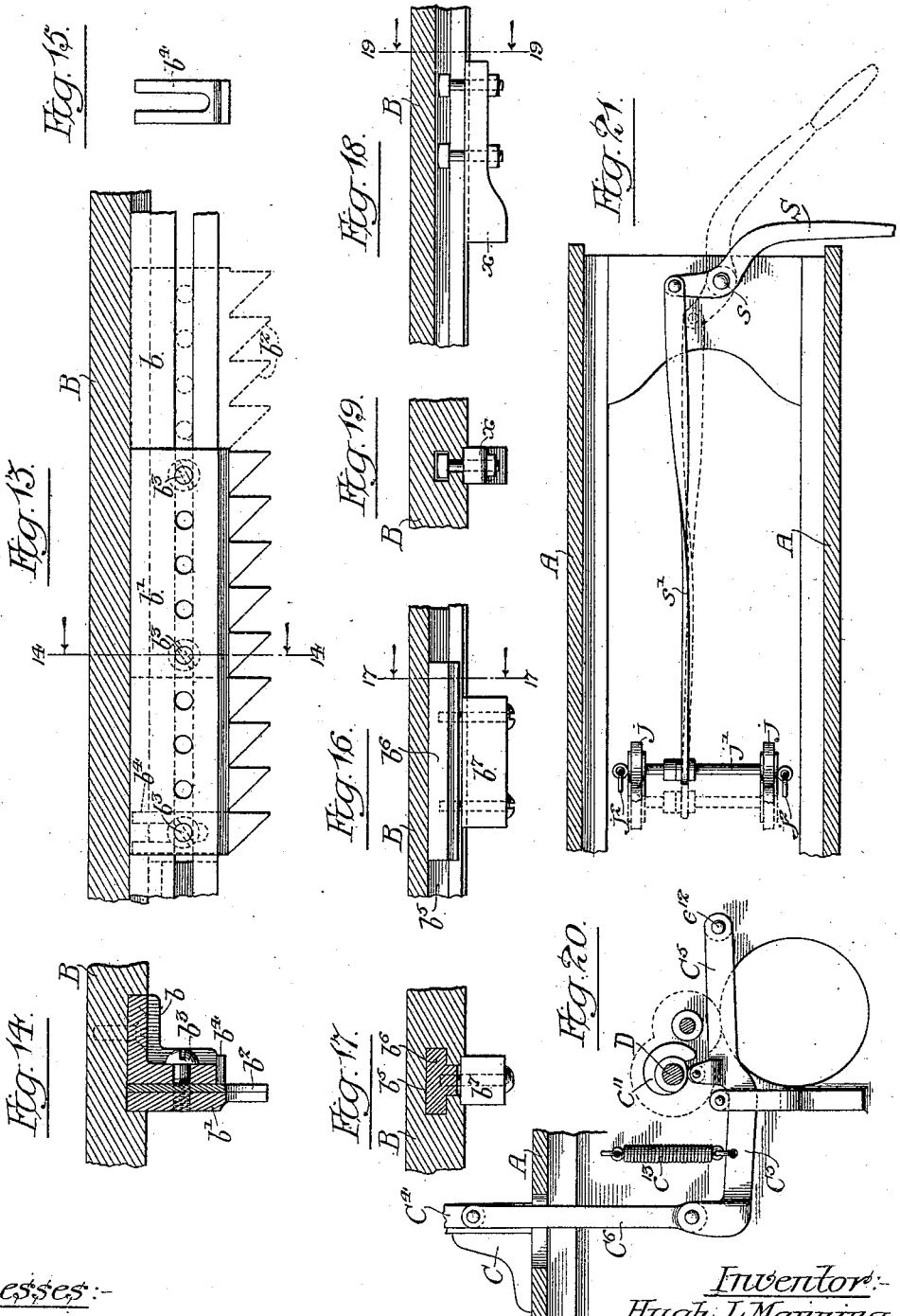

UNITED STATES PATENT OFFICE.

HUGH LOUIS MANNING, OF PHILADELPHIA, PENNSYLVANIA.

BLIND-STILE-BORING MACHINE.

SPECIFICATION forming part of Letters Patent No. 645,822, dated March 20, 1900.

Application filed April 22, 1899. Serial No. 714,045. (No model.)

*To all whom it may concern:*

Be it known that I, HUGH LOUIS MANNING, a citizen of the United States, residing in Philadelphia, Pennsylvania, have invented certain Improvements in Blind-Stile-Boring Machines, of which the following is a specification.

The object of my invention is to construct a machine for boring holes in a series of blind stiles or frames simultaneously, the holes thus bored serving to receive the pivot ends of the blind-slats.

My invention relates particularly to the mechanism for feeding the bed on which the blind stiles or frames are clamped, said mechanism being arranged and operating in such manner that the holes will be properly spaced, each stile will be completed, and the table returned without interruption, the feeding mechanism being also automatic, so that the blind-stiles will be moved longer distances at intervals to allow sufficient space for the crossrails of the blind. The machine is so arranged that these spaces can be varied according to the design of the blind stile or frame.

Figure 10:
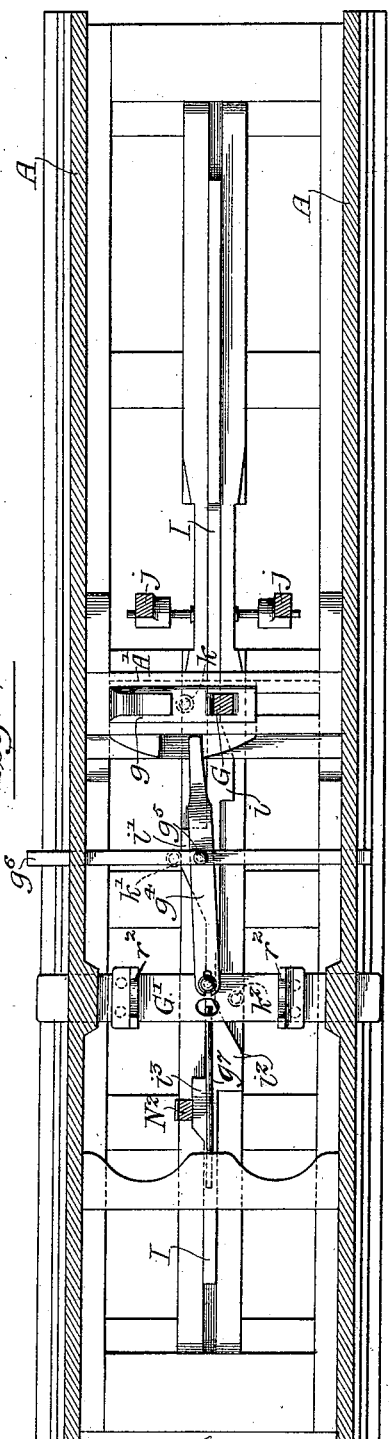
Figure 11:
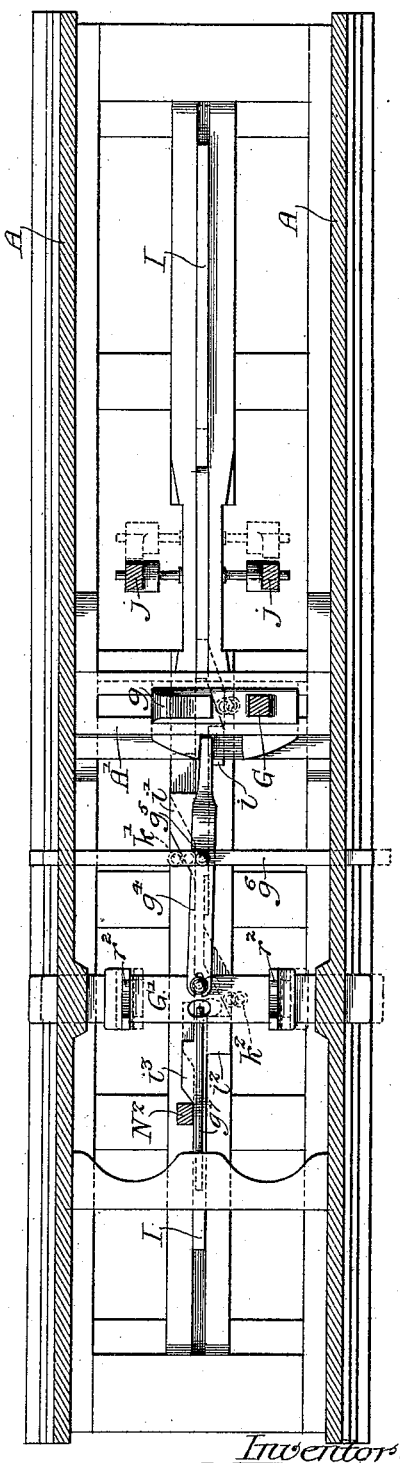

In the accompanying drawings, Figure 1 is a side view of my improved boring-machine. Fig. 2 is a plan view of the same. Fig. 3 is a longitudinal section of the machine on the line 3 3, Fig. 2. Fig. 4 is a transverse section of the machine on the line 4 4, Fig. 1. Fig. 5 is a transverse section of the machine on the line 5 5, Fig. 1. Figs. 6, 7, and 8 are detail transverse sectional views showing special features of the machine. Figs. 9, 10, and 11 are sectional plan views on the line 9 9, Fig. 1, showing the parts in different positions. Fig. 12 is a detail plan view of the device for clamping the stiles on the bed of the machine, said clamping device being shown in the retracted position. Figs. 13, 14, and 15 are detail views of the adjustable feed-rack. Figs. 16 and 17 are detail views of the devices for stopping the rotation of the feed-cam. Figs. 18 and 19 are detail views of the stops arranged at each end of the table. Fig. 20 is a detail view showing the means for feeding the boring-tools to the work. Fig. 21 is a detail view of the device for moving the shifting-lever. Fig. 22 is a longitudinal sectional view of the table. Fig. 23 is a detached view of the feed-cam. Fig. 24 is a detached view of the floating lever, and Fig. 25 is a plan view of the lower shifting-bar.

In the drawings, A is the frame of the machine, and B is the sliding table, on which are clamped the stiles of the blind-frame which are to be bored to receive the pivot ends of the slats. Mounted on the frame A is a standard C, which carries the drill-spindles for boring the holes in the stiles.

Before describing in detail the construction I will explain the general operation of the machine forming the subject of my invention.

A series of blind-stiles to be bored are clamped on the table B and the different parts of the mechanism of the machine are set for the length of stile to be bored and for the spaces for the cross-rails. The drill-spindles are then set to register with the center of each stile of the series to be bored. The machine is then put in motion and the table B is fed forward intermittently by a suitable cam acting upon a rack underneath the bed. At each revolution of this cam the table will be fed forward the distance of one tooth of the rack beneath the table. During the intervals of rest between the intermittent movements of the table the drills are forced downward by suitable mechanism against the series of stiles, boring holes in each one simultaneously. After this operation the drill-spindles recede and the cam again acts to move the table the distance of another tooth of the rack and so on during the boring of the holes in the stiles. When the space for one of the cross-rails of the stile is reached, the cam is locked against rotation and other mechanism feeds the table a distance equal to the space required for the cross-rail, after which the cam is released and acts to feed the table forward intermittently, as before, to permit the boring of the holes in the stiles until the space for another cross-rail is reached, when the operation just described is repeated. After one set of stiles have been bored the table is automatically returned to its original position, the finished stiles are removed from the same, other blanks are then clamped to the bed, and the foregoing operation is repeated.

Referring now to the drawings forming a part of this specification, I will first describe the drilling mechanism which I employ with the improved machine forming the subject of my invention.

Adapted to slide horizontally on the standard C is a frame C', having vertical guides $c$ for a frame $C^2$, in which are mounted a series of vertical shafts $c'$ for driving a series of drill-spindles $c^2$. The frame $C^2$ has a horizontal slot $c^3$, through which a series of screws extend having thumb-nuts $c^4$, and these nuts serve to secure the frame $C^2$ to the frame C'. Extendingly upwardly from the frame C' are two slotted bars $e^5$, adjustably secured to a cross-head $C^3$ by means of thumb-nuts $c^6$. On loosening these thumb-nuts the frame carrying the drills can be raised or lowered, and by loosening the thumb-nuts $c^4$ the lateral position of the drills can be altered.

The drill-spindles $c^2$ are geared together by pinions $c^7$, some of the spindles of the drills being directly connected to the driving-shafts $c'$. The drill-spindles $c^2$ are driven by the shafts $c'$, which receive their motion from a drum $c^9$ on a shaft $c^{10}$ by means of belts $c^8$, which pass around belt-pulleys on said shafts $c'$ and around the drum $c^9$. The shaft $c^{10}$ may be driven in any suitable manner, and in the present instance it is driven from a shaft W by a belt $w$, the shaft W being driven from the main driving-shaft F by means of a belt $w'$, as clearly shown in Fig. 2.

The drill-spindles $c^2$ are operatively connected to the cross-head $C^3$ and are carried by the same into and out of engagement with the blind-stiles to bore the holes therein in the following manner: The cross-head $C^3$ is carried by two vertically-reciprocating bars $c^4$, connected to operating-levers $C^5$ by links or connecting-rods $C^6$. The levers $C^5$ are operated to lower the cross-head carrying the spindles by means of cams $c^{11}$, mounted on a shaft D, arranged below the table of the machine. These cams are of the peculiar shape shown in Fig. 20, and they engage antifriction-rollers carried by the operating-levers $C^5$. The shaft D is driven from the shaft $F^3$ by means of a pinion $d$ on said shaft $F^3$ meshing with a gear-wheel $d'$, carried by the shaft D, more fully described hereinafter.

The levers $C^5$ are pivoted at $c^{12}$, and springs $c^{13}$ and $c^{14}$, the former being located below the table of the machine and the latter adjacent to the frame C', are used to return the said levers and the drill-frame to their elevated position. It will be understood, however, that positive mechanism, such as a cam, may be used, if desired, as an equivalent for these springs.

It will be noticed on reference to Fig. 20 that the cams $c^{11}$ are so shaped that they will gradually feed the drills into the stiles; but as soon as the work is completed they permit the drill-frame to be immediately returned to its normal position by the springs $c^{13}$ and $c^{14}$ as the faces of these cams change abruptly from high to low, thereby releasing quickly the engagement of the projections on the levers $C^5$.

On the under side of the table B are grooves adapted to fit over the V-shaped ribs projecting from the top of the frame, which latter act as guides for the table. Projecting beneath the center of the table in the present instance is a bar $b$, (shown clearly in Figs. 13 and 14,) and this bar consists, preferably, of a piece of angle-iron. Secured to the depending portion of this bar are rack-sections formed of toothed plates $b'$ and $b^2$, one placed directly back of the other, and these rack-sections are secured to the bar $b$ by screws $b^3$. The teeth of these rack-sections are of the shape clearly shown in Fig. 13, having vertical forward edges and beveled backs, so that the cam-shaped projection $e$ on the wheel E, Figs. 3 and 23, will act upon said rack-sections and feed the table forward. As shown in Fig. 3, there are four sets of rack-sections, spaced apart predetermined distances to correspond with the cross-rails that unite the stiles of the finished blind. As arranged in the view each pair of plates forming the sections is contracted and the machine is set to drill the smallest size of blind. When it is wished to increase the number of holes in each stile to make a longer blind, the screws $b^3$ are removed, and as there are a series of holes in each plate $b'$ and $b^2$ of the rack-sections, corresponding with the teeth of the same, it is only necessary to move one plate past the other, so as to increase the length of the sections and the number of teeth in each, and then secure the two plates $b'$ and $b^2$ to the depending bar $b$ by passing the screws through the proper holes. These screws not only clamp the plates forming the sections to the bar $b$, but they also bring the teeth of the rack-sections into proper alinement, so that it is impossible for the attendant to make a mistake in setting the machine for different-sized blinds. When the plates $b'$ and $b^2$ are drawn out, as shown by dotted lines in Fig. 13, one end of the plate $b'$ is unsupported, and at this end I use a U-shaped filling-piece $b^4$, Fig. 15, which is placed between the plate $b'$ and the depending portion of the bar $b$, so that when the screw draws the plate up it will be perfectly rigid. The U-shaped filling-piece has a lip on the under side by which it can be readily removed or replaced.

Referring now to Figs. 16, 17, and 22, I will describe the lugs which alternate with the rack-sections for the purpose of locking the feed-wheel when it is desired to move the table from one rack-section to the next. In a T-shaped groove $b^5$ in the under side of the table B are slides $b^6$, carrying lugs $b^7$, $b^8$, and $b^9$, which project from the under side of the table. These lugs are secured to the slides $b^6$ by screws in the present instance, so that by backing off the said screws the slides, with their lugs, are free to be moved longitudinally on the under side of the table in order that they may be arranged in proper position to alternate with the rack-sections described above and as shown in Fig. 22. The lugs $b^7$ represent the space occupied by the cross-rails, which extend from one stile to another. If the cross-rails are all of the same width, then all of the lugs $b^7$ are of the same size; but if, for instance, the machine is set as shown in Fig. 3, so that the central cross-rail is about twice the width of the ones on each side of it, then the central lug is of a width to correspond. The lug $b^8$ at one end of the table is longer than the lugs $b^7$, and the lug $b^9$ at the opposite end of the table is still longer than the lug $b^8$, as shown in Fig. 22, and these lugs are thus arranged so as to keep the cam-wheel E out of engagement with the rack-sections on the table until the intermittent feed is desired. As soon as the drills have completed their work the longer lug $b^9$ at the end of the table throws the cam-wheel E out of gear and keeps it out of gear until the table is reversed.

F is the main driving-shaft of the machine, mounted in suitable bearings, as shown clearly in Figs. 1 and 4, and is provided with fast and loose pulleys $f$ and $f'$. This shaft has a belt-wheel $F'$, around which passes a belt $f^2$ to a pulley $f^3$ on a shaft $F^2$, on which is a drum $f^4$. On a shaft $F^3$ are fast and loose pulleys $f^5$ and $f^6$, around which pass a belt $f^7$ from the drum $f^4$. Shifting mechanism, which will be described hereinafter, serves to move the belt $f^7$ either from the fast to the loose pulley, or vice versa, at certain intervals. On the shaft $F^3$ is a pinion $d$, and on the shaft D is a gear-wheel $d'$, meshing with the pinion $d$, so that slow motion is imparted to the shaft D through the gearing above described. Carried by the shaft D are the cams $c^{11}$ for actuating the drill-frame, as fully described above, and mounted also on this shaft is a bevel-wheel $d^2$, meshing with the bevel-wheel $d^3$ on the shaft $E'$, which carries the cam-wheel E. The cam-wheel E has arranged on its periphery a projection $e$, which performs the function of a worm or cam. As clearly shown in Fig. 23, I preferably make this projection a portion of a detachable plate set into the periphery of the cam-wheel E and secured therein by screws, so that it can be removed when necessary. By this arrangement the cam-section can be removed and replaced when worn without discarding the entire wheel and without dismantling the machine. This projection or cam-section $e$ engages the teeth of the rack-sections formed by the plates $b'$ and $b^2$, as clearly illustrated in Figs. 3 and 7, so as to feed the table forward the proper distance, represented by one tooth of the rack-sections, at each revolution of the wheel E. In the present instance I have arranged the projection $e$ on the cam-wheel in such a manner that the table will be moved by said projection during the first period of the revolution of said cam-wheel, such movement being less than a quarter-turn of the wheel. During the balance of the movement of said wheel, however, the table will remain stationary, allowing sufficient time for the drilling of the holes in the stiles and the retraction of the drill-spindles before the projection on the cam-wheel comes into position to move the table forward again.

Referring now to Figs. 4 and 7, I will describe the mechanism for throwing out of action the cam-wheel E to permit the forward movement of the table independently of said wheel, the drill-spindles being kept out of action at the same time. When that portion of the series of stiles representing the space for a cross-piece comes beneath the drill-frame, it is necessary to stop the drilling mechanism and move the table independently of the cam-wheel E. The cam-wheel E is therefore thrown out of action at this point and independent mechanism for feeding the table brought into action, so that while the table will be fed forward, carrying the stiles the proper distance to bring them into position to receive the first of the next series of holes, there will be no movement of the drill-spindles until the stiles are in this predetermined position. The mechanism for putting the wheel E out of action is as follows: At the bottom of the frame A is a fixed cross-bar $A'$, on which slides a belt-shifter $g$, pivoted at $g'$ to what I term a "floating lever" G (shown in detached view, Fig. 24) and so called because although pivoted to the belt-shifter $g$ it is not positively connected to any other portion of the machine. This lever extends up to a point directly under the table B, as clearly illustrated in Figs. 4 and 7, and has a lug $g^2$ adjacent to the shaft $E'$, carrying the cam-wheel E. The lever is held against the shaft $E'$ by means of a spring $g^3$, and this spring also tends to keep the belt-shifter in its normal position (shown in Fig. 7) when the table is feeding forward. Mounted on the face of the cam-wheel E is a pin $e'$, which engages the floating lever G, and as the cam-wheel revolves to feed the table during the boring of the holes it simply pushes back the upper end of the lever G, and this action takes place at every revolution of the cam-wheel. If, however, the position of the feed-table brings one of the lugs $b^7$ in the path of movement of the upper end of this lever G, the said lug will act as a fulcrum for the lever, so that when the pin $e'$, carried by the cam-wheel E, pushes against the lever, as in Fig. 4, instead of the lever being pushed out of the way, as before, its lower end will be moved against the pressure of the spring $g^3$, and this end of said lever being connected to the belt-shifter $g$ the latter will be moved, transferring the belt $f^7$ from the fast pulley $f^5$ to the loose pulley $f^6$, thus stopping the rotation of the shafts $F^3$, D, and $E'$ and putting the cam-wheel E out of action. When in this position, the lug $g^2$ on the lever G forms a stop for the pin $e'$, carried by the cam-wheel E. This pin is preferably provided with an antifriction-roller.

In order to bring the independent mechanism for moving the table into action simultaneously with the putting out of action of the cam-wheel E, I connect a pulley-shifting bar G' (shown in Figs. 9, 10, and 11) with the belt-shifter $g$ by means of a lever $g^4$, pivoted at $g^5$ to a cross-bar $g^6$, so that when the belt-shifter $g$ is moved to shift the belt $f^7$ from the fast to the loose pulley, as described above, the pulley-shifter is so moved that the forward feed-pulley $h$ on the shaft H (see Fig. 5) will be brought into position to drive the table through this independent mechanism, which will shortly be described. A spring $g^7$ serves to keep the pulley-shifter G' in the central position, as shown in Fig. 11. As the table is moved forward by the independent mechanism the lug $b^7$ will pass the upper end of the lever G, thereby releasing said lever and permitting the spring $g^3$ to act on the belt-shifter $g$ to move the belt $f^7$ back onto the fast pulley $f^5$. The return of the lever G to its normal position brings the pulley-shifter G' back to its original position, throwing the pulley $h$ out of engagement with the shaft H, thereby stopping the independent feed of the table, and the latter is then free to be moved by the cam-wheel E, as before.

The shaft H is adapted to bearings in the lower portion of the frame A of the machine, and secured to each end of this shaft are bevel-pinions $r$, meshing with bevel-pinions $r'$, carried by vertical shafts H', through which medium said vertical shafts are driven by the shaft H. Loosely mounted on the shaft H are the pulleys $h$ and $h^2$, controlled by the pulley-shifter G'. Each of these pulleys has an annular groove engaged by lips $r^2$, carried by said pulley-shifter. The shaft H carries a pin $h'$, and each of the pulleys $h$ and $h^2$ carry pins $h^3$ and $h^4$, respectively, the pins of the pulleys alternately engaging the pin $h'$ on the shaft H as the said pulleys are moved by the shifter G'. When the cam-wheel E is in operation and the table is being fed thereby, the pulley-shifter is in the mid-position, as shown by full lines in Fig. 11, both pulleys $h$ and $h^2$ being out of engagement with the shaft H. When the shifter G' is moved as before described, however, the pulley $h$ is brought into engagement with the pin $h'$ on the shaft H, and as this pulley is driven by a suitable belt from a driving-pulley on the shaft W it will drive the shaft H forward, which in turn will drive the vertical shafts H' through the medium of the bevel-pinions $r$ and $r'$. The shafts H' have pinions $h^5$ at the top of the same, which mesh with pinions $h^6$, mounted on studs on top of the frame A, as shown in Fig. 2, these latter pinions gearing with toothed racks B', secured to the table B. By this means the table will be fed forward by the movement of the shaft H during the time the cam-wheel E is out of action. When the table reaches the end of its movement, the pulley $h^2$ is brought into engagement with the pin $h'$ on the shaft H to drive the shafts H', and as the pulley $h^2$ is driven in a reverse direction to the pulley $h$ by means of a crossed belt from the driving-pulley on the shaft W the shafts H' will be rotated in a reverse direction through the medium of the bevel-pinions $r$ and $r'$, and this movement being transmitted by the pinions $h^5$ and $h^6$ to the rack B' of the table the latter will be returned to its original position. In order to make this operation automatic, I use stops $x$, as shown in Figs. 18, 19, and 22, which stops are secured to the under side of the table at each end of the same by means of headed bolts, the heads of which are adapted to the T-shaped groove $b^5$ in the table, so that the lugs or stops $x$ can be adjusted to shift the table at any point in its movement. The mechanism operated by the stops $x$ to shift the table will be more fully described hereinafter.

I is a longitudinally-movable shifting-bar adapted to suitable guides in the base of the machine and having projections $i$, $i'$, $i^2$, and $i^3$, (clearly shown in Fig. 25,) which projections engage the belt-shifter $g$, pulley-shifter G', and other parts of the mechanism to be shortly described. In the plan view shown in Fig. 9 this mechanism is in the position shown by the main views, Figs. 1, 2, and 3.

Depending from the under side of the belt-shifter $g$ is a pin $k$, and the projection $i$ of the shifting-bar I acts on this pin to push the belt-shifter $g$ over, when the shifting-bar I is moved to the position shown in Fig. 11, so as to hold the belt $f^7$ on the loose pulley $f^6$ of the shaft $F^8$, and thus stop the movement of the forward intermittent feeding mechanism. On the laterally-movable bar $g^6$, which is pivoted to the lever $g^4$, connecting the belt-shifter $g$ with the pulley-shifter G', is a pin $k'$, against which the projection $i'$ of the shifting-bar I acts, so as to lock this bar $g^6$ in the position as indicated in Figs. 9 and 10 when the machine is feeding forward and boring, but will allow the bar $g^6$ to move laterally when the table is returned, as shown in Fig. 11.

On the under side of the pulley-shifter G' is a pin $k^2$, and the projection $i^2$ of the shifting-bar I is so situated in respect to this pin $k^2$ that the latter is clear of the projection when the table is moving forward, but when returning the projection passes in front of the pin $k^2$ and holds the pulley-shifter G', so that the pin $h^4$ on the pulley $h^2$ will be in engagement with the pin $h'$ on the shaft H, whereby the latter is turned in a direction opposite to that in which it was turned by the pulley $h$, thus reversing the movement of the table.

J is a lever (shown clearly in Figs. 3 and 6) having two arms $j j$, carried by a rock-shaft J', mounted in suitable bearings in the frame. The lower portion of each of these arms $j$ is connected to the shifting-bar I, and the upper portions of the arms are connected together by a cross-bar $j'$. Carried by the upper portion of each arm $j$ is an eye $j^2$, to which are attached ropes $n$, as shown in Fig. 3. These ropes are secured to and partly wound around a drum N, as shown in Figs. 3, 5, and 8. The drum N is loosely mounted on a shaft N', adapted to suitable bearings in the frame of the machine, and said drum is provided with a pin $n'$, adapted to engage a pin $n^2$ on the shaft N', whereby the parts may be brought into operative relation with each other. The drum N is hollow at one end, and carried by the shaft N' and adapted to this hollow portion of the drum is a spring $n^3$. This spring is adapted to move the drum laterally and maintain the pin $n'$, carried by the same, in connection with the pin $n^2$ on the shaft N'. To move the drum in the opposite direction and hold it when in such position, a lever $N^2$ is provided, said lever being pivoted at $n^4$ to a crossbar at the lower part of the frame and having at the upper end a forked portion engaging pins $n^5$, carried by a yoke $n^6$, adapted to an annular groove in the drum N. In Fig. 5 the drum is shown as pushed to one side by the lever $N^2$, the pins $n'$ and $n^2$ being disengaged. In Fig. 8 the lever $N^2$ has returned to its normal position, and the drum is shown moved over, with its pin $n'$ in engagement with the pin $n^2$ of the shaft N', the spring $n^3$ having acted on the drum to return it to this position. The lower arm of the lever $N^2$ is engaged by the projection $i^3$ on the shifting-bar I when the machine is feeding forward and boring, as clearly shown in Figs. 9 and 10, to keep the drum out of engagement with its shaft, so that it will remain stationary. When the shifting-bar I is moved to the position shown in Fig. 11, however, to allow the table to return, the lever $N^2$ is freed from the control of the projection $i^3$, and the spring $n^3$ will force the drum N over, so that its pin $n'$ will engage with the pin $n^2$ on the shaft N', and as this shaft is driven from the driven shaft W by belts $w^2$, which pass around wheels $w^3$ on said shaft N', the drum will be turned and the rope $n$ will be coiled thereon. As this rope is connected to the lever J, it will draw said lever over to its full throw, as it will be understood that when the stop $x$ came in contact with the lever J it only moved the latter over to the central position, bringing the shifting-bar to the position shown in full lines in Fig. 11. When the drum is turned, however, it will move the lever J and the shifting-bar I over to the position shown by dotted lines in Fig. 11, thus completely throwing over the belt-shifter $g$, and with it the bar $g^6$, and locking the pulley-shifter G' in such position that the pulley $h^2$ will engage the shaft H in order that the table may be returned to its original position by the pinions $h^6$ engaging the racks B' on said table.

On the frame A is a shaft P, (shown in Figs. 1, 2, 4, and 5,) having at its upper end a toothed segment $p$, adapted to be engaged by the teeth of one of the racks B' of the table during the movement of the latter. A two-armed spring $p'$ is employed to keep the segment in position to be engaged by the rack. On the lower end of this shaft is a rope-wheel $p^2$, to which is secured a rope $p^3$, passing around a guide-wheel $p^4$, mounted on a stud projecting from the frame, said rope being secured to an eye $p^5$ on the lever $N^2$, as shown in Fig. 5. The object of this construction is to give the shaft P a partial revolution by means of its segment $p$ as soon as the table moves forward in order to draw the lever $N^2$ over to the position shown in Fig. 5, such action immediately throwing the pin $n'$ of the drum N out of engagement with the pin $n^2$ on the shaft N'. On the return movement of the table the segment $p$ will slacken up the rope $p^3$, so that it will have no control over the movement of the drum N, and the latter will immediately on the release of the lever $N^2$ be shifted over to move the pin $n'$ into engagement with the pin $n^2$ on its shaft N.

By the above mechanism the table is moved forward and automatically returned and is stopped at the end of its return movement. To move the table forward again, I provide a starting-lever S, Fig. 21, which is pivoted to the frame at $s$ and is connected to the cross-bar $j'$ by a rod $s'$, so that when the stop $x$ on the table brings the lever J up to its vertical position all that it is necessary to do to start the table forward again is to operate the hand-lever S so as to throw the lever J into the position shown in Fig. 3, when all the parts will be in the proper position to permit the table to be fed forward, and the stiles will be bored in the proper manner.

Any suitable means may be employed to clamp the stiles to the bed of the table; but in Figs. 2, 4, 5, and 12 I have shown the form of clamping device which I prefer to use and which is constructed and arranged as follows: I mount on one side of the table B an angle-plate T, which is adjustable transversely on the table and may be held in its adjusted positions by thumb-nuts $t$, adapted to bolts passing through slots in the bed of the table. At one end of the table is a stop-frame T', having a slot $t'$, through which pass bolts $t^2$, secured to the bed of the table, by which means the stop-frame can be adjusted longitudinally on the table. The ends of the stiles rest against this stop-frame T' while they are being bored. On the edge of the table opposite the angle-plate T is a clamp V, between which and said plate T the stiles are held. This clamp is made in three sections, one section $v$ being fixed to the table, another section $v'$ adapted to be projected against the stiles, and a third section $v^2$ interposed between the sections $v$ and $v'$, connected to said sections by links $v^3$, and adapted to be moved longitudinally, so as to force the section $v'$ against the stiles. Springs $v^4$ are employed to draw the sections of the clamp together when the latter is not in use. The section $v'$ is held against longitudinal movement by means of a pin $v^5$, depending from said section, which pin projects into a slot $v^6$ in the table. The section $v^2$ is connected by a link $v^7$ to a pivoted lever V', by which means said section is operated to force the section $v'$ into engagement with the series of stiles mounted on the bed of the machine. When the lever V' is moved to the position shown in Fig. 2, the section v' will be extended so as to clamp the stiles firmly in position on the table; but when the lever is moved into the position shown in Fig. 12 the section v' will be retracted.

Thus it will be seen that by my improved machine I am enabled to accurately bore the pivot-holes in the stiles for the blind-slats, and the machine can be set so as to automatically space the series of holes for such slats to allow for the insertion of the cross-rails at the proper places, and the stiles can be of any number, any length, and of any width within the limits of the machine. When the stiles have been clamped to the bed and the machine has been set in motion, the holes will be automatically bored. When a space for the cross-rails is reached, the ratchet feed mechanism will be thrown out of gear, as well as the boring mechanism, and the table will be fed forward by independent mechanism already described until the ratchet mechanism and drilling mechanism are again thrown into gear. When the table reaches the end of its stroke, one of the stops $x$ on the under side of the same will shift the lever J to its central position, and this will throw into operation mechanism to complete the movement of said lever, so as to throw it over the full stroke and allow the table to return by a reverse movement of one portion of the feeding mechanism. When the table reaches a certain point on its return movement, another stop $x$ will strike the lever J and throw it again over to the central position and the mechanism will remain stationary until the hand operating-lever S throws the lever J over the full stroke, when the table will again move forward, as described above.

I claim as my invention—

1. The combination in a machine for boring the stiles of blinds, of a frame, a table on which the stiles are mounted, drilling mechanism for boring the holes in the stiles, means for driving the drills, means for feeding the table forward intermittently the distance from one hole to another, independent means for feeding the table forward at the points where the cross-bars are located, and means for automatically returning the table to its original position, substantially as described.

2. The combination of a frame, drilling mechanism carried by said frame, a table on which are mounted the stiles to be bored, a sectional rack on the table, lugs on the table alternating with the racks, a feed-cam acting upon the racks to feed the table forward, and a lever acting in conjunction with the lugs on the table to throw the feed-cam out of gear, and mechanism for feeding the table forward while the feed-cam is out of gear, substantially as described.

3. The combination in a boring-machine, of a frame, a table adapted to travel thereon to which the stiles to be bored are secured, a frame in which the drill-spindles are mounted, means for intermittently raising and lowering said drill-frame, mechanism for intermittently feeding the table while the drill-frame is being raised, provision for adjusting said drill-frame both vertically and horizontally, and mechanism for moving the table at predetermined intervals independently of the intermittent feed of the latter, substantially as described.

4. The combination of the frame, a table thereon to which the stiles to be bored are secured, means for intermittently feeding the table forward, a vertically-movable drill-frame, drills carried thereby, means for rotating said drills, a driven shaft, cams on the driven shaft, levers connected to the drill-frame and actuated by the cam whereby the drills are presented to the stiles, independent means for raising the drill-frame and drills after the holes have been bored, and mechanism for moving the table at predetermined intervals independently of the intermittent feed of the latter, substantially as described.

5. The combination of a frame, a table adapted to travel thereon to which the stiles to be drilled are secured, means for intermittently feeding the table forward, a cross-head mounted on vertically-reciprocating rods, means for reciprocating said cross-head, a transversely-adjustable frame suspended from said cross-head, a vertically-adjustable frame carried thereby, drill-spindles mounted on the vertically-adjustable frame, means for driving said spindles, and mechanism for moving the table at predetermined intervals independently of the intermittent feed of the latter, substantially as described.

6. The combination in a boring-machine, of a frame, a table on which the stiles to be bored are secured mounted thereon, drilling mechanism mounted on the frame and arranged above the table, a bar having a depending portion secured to the under side of the table, a series of adjustable rack-sections secured to the depending portion of said bar, lugs adjustably secured to the under side of the table and alternating with the rack-sections, a feed-cam adapted to engage the teeth of the rack-sections, driving mechanism for said cam, a lever engaged by said lugs and serving to shift the driving mechanism for the feed-cam to throw the latter out of action, and means for feeding the table forward when the feed-cam is out of action, substantially as described.

7. The combination in a boring-machine, of a frame, a longitudinally-movable table mounted thereon, drilling mechanism carried by the frame, adjustable rack-sections mounted on the under side of the table, a driven wheel, a projection forming a cam arranged on a portion of the periphery of said wheel, said projection adapted to engage the teeth of the rack-sections whereby the table will be moved intermittently, and means for holding said driven wheel out of action, substantially as described.

8. The combination of the frame, the table mounted thereon, drilling mechanism, a feed-rack on the under side of the table, and a driven wheel having a removable cam-section engaging the rack of the table whereby the latter is fed forward intermittently, substantially as described.

9. The combination in a machine for boring blind-stiles, of the frame, a table adapted to travel thereon, drilling mechanism, a toothed rack on the under side of the table, a feed cam-wheel engaging said rack to feed the table intermittently, lugs on the under side of the table, mechanism controlled by the lugs to throw the cam out of gear, toothed racks on one or both sides of the table, pinions engaging said racks, a series of shifting mechanisms for throwing the pinions into and out of gear, and mechanism connecting the several shifting devices so that the table will be moved by the racks and pinions when the cam-wheel is out of gear, substantially as described.

10. The combination in a boring-machine, of the frame, drilling mechanism, a table adapted to travel on the frame, ratchet-teeth on the under side of the table, a feed cam-wheel engaging said ratchet-teeth and adapted to feed the table forward intermittently, racks on the edge of the table, pinions engaging said racks, mechanism for rotating said pinions, a belt-shifter controlling the mechanism for rotating said pinions whereby they may be turned in opposite directions to move the table forward or back, means for actuating the belt-shifter, stops on the under side of the table, and reversing mechanism in operative engagement with the belt-shifter, whereby when the stops come in contact with the reversing mechanism, the pinions will be rotated so as to return the table to its original position, substantially as described.

11. The combination in a boring-machine, of the frame, drilling mechanism, a table adapted to travel on the frame, ratchet-teeth on the under side of the table, a feed cam-wheel engaging said ratchet-teeth and adapted to feed the table forward intermittently, racks on the edge of the table, pinions engaging said racks, mechanism for driving said pinions, a belt-shifter connected therewith whereby the direction of rotation of the pinions engaging the racks on the sides of the table, is controlled, stops on the under side of the table, and reversing mechanism for actuating said belt-shifter when said reversing mechanism is engaged by the stops whereby the table will be returned to its original position, substantially as described.

12. The combination of the frame, a table adapted to travel thereon, drilling mechanism, a cam-wheel for feeding the table forward intermittently, lugs on the table, mechanism controlled by the lugs to throw the cam-wheel out of gear, driving mechanism, means for reversing said driving mechanism so that it will either feed the table forward or backward, the driving mechanism being so connected with the reversing mechanism that it will be thrown into gear to drive the table forward when the cam-wheel is thrown out of gear, and a stop on the table adapted to reverse the motion of the feed mechanism, substantially as described.

13. The combination of a frame, a table mounted thereon, drilling mechanism, means for feeding the table forward intermittently, means for throwing this intermittent mechanism out of engagement, independent mechanism for feeding the table either forward or backward, shifting mechanism, and a shifting-bar in the bottom of the frame, with intermittent mechanism acting on the shifting-bar so as to reverse the table automatically and return it to its original position, substantially as described.

14. The combination in a blind-stile-boring machine, of the frame, a table, drilling mechanism, means for feeding the table forward, a clamp for the stiles consisting of three bars arranged side by side, the center bar being connected to the side bars by links and springs, and means for moving the center bar to clamp the stiles on the table, substantially as described.

15. The combination in a blind-stile-boring machine, of the frame, a table, drilling mechanism, means for feeding the table forward, a clamp for the stiles consisting of three bars arranged side by side, one of said bars being rigid, another bar adapted to be moved laterally but held against longitudinal movement, a third bar arranged between the other two and serving as the operating-bar, provision for connecting said bars together, springs connected to the bars for keeping the clamp in the retracted position, and a lever for moving the operating-bar longitudinally so as to bring the laterally-moving bar of the clamp into engagement with the stiles, substantially as described.

16. The combination in a blind-stile-boring machine, of the frame, a table, boring mechanism, means for feeding the table forward, a clamp for the stiles consisting of three bars arranged side by side, one of said bars being rigid, and means for holding one of the other bars against longitudinal movement, a third bar being the operating-bar and connected to the other two bars, springs also connected to the bars, and a lever for moving the operating-bar longitudinally, substantially as described.

17. The combination in a blind-stile-boring machine, of the frame, a table, means for intermittently feeding the table forward, means for returning the table, a shifter-bar serving to move into action the means for returning the table, and a lever connected to said shifter-bar and adapted to be acted upon by stops on the table, substantially as described.

18. The combination of the frame, a table B, sectional rack-plates $b'$ and $b^2$ secured to the under side of the table, lugs $b^7$, $b^8$ and $b^9$ also secured to the under side of the table, a cam-wheel E having a section $e$ adapted to engage the teeth of the rack-plates $b'$ and $b^2$, a shaft E' on which the wheel E is mounted, a driven shaft D geared to the shaft E', means for driving said shaft D including suitable belts, belt-shifting mechanism, a floating lever G forming part of the actuating mechanism of the belt-shifter, a pin $e'$ on the wheel E adapted to move the lever G, the upper end of said lever being adjacent to the path of the lugs $b^7$, $b^8$ and $b^9$, substantially as described.

19. The combination of the frame, a table B, rack-plates $b'$ and $b^2$ on the under side of the table, lugs $b^7$, $b^8$ and $b^9$, also on the under side of the table, a driven shaft $F^3$ having fast and loose pulleys thereon, a belt-shifter $g$ adapted to shift the belt from one pulley to another, a floating lever G connected to the shifter $g$, the upper end of said lever being adjacent to the path of the lugs, a shaft E' driven by the shaft $F^3$ and having a cam-wheel E thereon, the cam-section of said wheel engaging the teeth of the rack-sections, and a pin $e'$ on said wheel adapted to move the lever G, substantially as described.

20. The combination of the frame, a table B, rack-plates on the under side of the table, lugs $b^7$, $b^8$ and $b^9$, arranged opposite the spaces between said rack-plates, a driving-shaft F, a drum-shaft $F^2$ belted to the driving-shaft, a shaft $F^3$ having fast and loose pulleys thereon and connected by belts to the drum-shaft $F^2$, a pinion on the shaft $F^3$, a shaft D having a gear-wheel thereon meshing with said pinion, a shaft E' at right angles to the shaft D and geared thereto by bevel-wheels, a cam-wheel on said shaft E', the cam of said wheel engaging the rack-teeth on the under side of the table, a belt-shifter for moving the belt that drives the shaft $F^3$, a floating lever connected to said belt-shifter, the upper end of said lever being adjacent to the path of the lugs on the under side of the table, a spring $g^3$ connected to said lever, and a pin $e'$ on the cam-wheel acting upon the floating lever, substantially as described.

21. The combination of the frame, a table B, a driven shaft D, a shaft E' geared to the shaft D, a feed cam-wheel on said shaft, racks on the under side of the table with which the cam-wheel engages to intermittently move the table forward, a drill-frame, drills carried thereby, pivoted levers $C^5$ connected to the drill-frame, cams on the shaft D for actuating the levers to draw the drill-frame down, with means for driving the drills carried by the drill-frame, substantially as described.

22. The combination of the frame, a table on which the stiles to be drilled are mounted, a drill-frame adapted to guides arranged above the table, drill-spindles carried by said frame, means for driving the spindles, adjustable rack-plates made in sections and secured to the under side of the table, lugs $b^7$, $b^8$ and $b^9$ also adjustable and secured on the under side of the table, a driven shaft D having cams $c^{11}$ at each side, levers $c^5$ pivoted to the frame and actuated by the cams, a connecting-rod $c^6$, slides $c^4$ connected to the rods and carrying the drill-frame, a longitudinal shaft E' geared to the shaft D, a cam-wheel E on said shaft E' having a cam-section $e$ adapted to engage the teeth of the rack-plates on the under side of the table means controlled by the lugs $b^7$ for throwing the shaft D out of gear during certain portions of the movement, and independent mechanism for driving the table forward while the shaft D is out of gear, substantially as described.

23. The combination of the frame A, table B, means for intermittently feeding the table forward, means for throwing such intermittent feed out of action, racks on each side of the table, pinions engaging said racks, means for driving said pinions, and shifting mechanism for reversing the movement of the driving mechanism so that said mechanism will drive the table either forward or backward, substantially as described.

24. The combination of the frame, the table, racks on the under side of the table suitably spaced apart, lugs also on the under side of the table arranged opposite the spaces of the racks, mechanism engaging said racks for feeding the table forward intermittently, mechanism controlled by the lugs for stopping the intermittent forward feed of the table, a rack secured to one side of the table, a pinion engaging said rack, means for rotating the pinion to drive the rack either forward or backward, reversing mechanism, and stops on the table for controlling said reversing mechanism, substantially as described.

25. The combination of the frame, a table, intermittent mechanism for driving the table forward, a shaft $F^3$, fast and loose pulleys on the shaft controlling the mechanism for feeding the table forward, a belt-shifter $g$ for shifting the belt onto the fast or the loose pulley, independent means for driving the table either in the forward or reverse direction, a shaft connected to said mechanism, loose pulleys on said shaft and a shifter G' for throwing either of the loose pulleys into gear with the shaft, a lever $g^4$ connecting the two shifters, a cross-bar $g^6$ to which this lever is pivoted, a rope-drum, a lever $N^2$ controlling the position of said rope-drum so as to throw it into or out of gear with its shaft, a lever J controlling the reversing mechanism, a rope secured to the drum and connected to said lever J, and a longitudinal shifting-bar I having projections $i$, $i'$, $i^2$ and $i^3$ coacting with and serving to move the shifters $g$ and G', bar $g^6$ and lever $N^2$, said bar serving also to move the lever J which is pivotally connected thereto, substantially as described.

26. The combination of the frame, the table B, racks at the side of the table, pinions $h^6$ engaging said racks, shafts H', pinions $h^5$ meshing with the pinions $h^6$, a shaft H geared to the shafts H′, loose pulleys on said shaft H driven in opposite directions, clutching mechanism for clutching either loose pulley to the shaft, a shifter G⁷ controlling the position of the pulleys, with means for operating said shifter, substantially as described.

27. The combination of the frame, a table, means for intermittently feeding the table forward, means for throwing out said forward-feed mechanism, a driven shaft H, loose pulleys on said driven shaft, means for throwing one or the other of the pulleys into engagement with the shaft, pinions driven by said shaft and adapted to racks on the table, a shifter-bar I, a pivoted lever J connected to said shifter-bar, a rope-drum, ropes secured to said drum and connected to the lever J, a shaft N′ on which the rope-drum is mounted, clutch mechanism between the drum and the shaft, a lever $N^2$, a shaft P, a rope connected to the lever and passing around a pulley on said shaft, a toothed segment $p$ on the shaft P adapted to engage the rack on the table so that when the table is reversed the segment will move a predetermined distance, shifting the rope-drum and throwing the intermittent feed into operative position, substantially as and for the purpose set forth.

28. The combination in a machine for boring the holes in blind-stiles, of a frame, a table adapted to travel thereon, a rack on each side of the table, pinions engaging said racks, a shaft H geared to said pinions, loose pulleys on the shaft, clutch mechanism by which either one of the pulleys can be thrown into gear, means for driving the pulleys in opposite directions, a pulley-shifter G′, a rack on the under side of the table, a cam-wheel engaging said rack to feed the table forward intermittently, a shaft $F^3$ having fast and loose pulleys thereon and adapted to drive the cam-wheel, a pin on the cam-wheel, a floating lever G engaged by said pin, a belt-shifter $g$ connected to the floating lever, lugs on the under side of the table adjacent to the path of the lever G, a driven shaft N′, a rope-drum on said shaft, clutch mechanism therefor, a lever $N^2$ for throwing the drum into and out of engagement with its shaft, a toothed segment engaging one of the racks of the table, a shaft on which the segment is mounted, a rope-wheel on said shaft, and a rope extending from said wheel to a lever $N^2$, a lever J, a rope extending from the lever J to the rope-drum, a shifter-bar I to which said lever J is pivoted, a cross-bar $g^6$, a connecting-lever $g^4$ pivoted to the bar $g^6$ and engaging the belt-shifter $g$ and a pulley-shifter G′, projections on the shifter-bar I adapted to operate the belt-shifter $g$, the bar $g^4$, the pulley-shifter G′ and the lever $N^2$ when the lever J is moved, and stops $x, x$, on the table for actuating the lever J, substantially as and for the purpose set forth.

In testimony whereof I have signed my name to this specification in the presence of two subscribing witnesses.

HUGH LOUIS MANNING.

Witnesses:
THOS. F. MANNING,
JOS. H. KLEIN.